United States Patent
Abe

(10) Patent No.: US 6,963,666 B2
(45) Date of Patent: Nov. 8, 2005

(54) MATCHING DEVICE

(75) Inventor: Nobuaki Abe, Saitama (JP)

(73) Assignee: PENTAX Corporation, Tokyo (JP)

( * ) Notice: Subject to any disclaimer, the term of this patent is extended or adjusted under 35 U.S.C. 154(b) by 727 days.

(21) Appl. No.: 09/946,483

(22) Filed: Sep. 6, 2001

(65) Prior Publication Data

US 2002/0031261 A1 Mar. 14, 2002

(30) Foreign Application Priority Data

Sep. 12, 2000 (JP) .................................... P2000-275816
Sep. 12, 2000 (JP) .................................... P2000-276113

(51) Int. Cl.[7] .......................... G06K 9/62; G06K 9/46; G06K 9/68; G01C 11/00; G01C 11/02
(52) U.S. Cl. ...................... 382/209; 382/190; 382/194; 382/217; 382/218; 356/918; 356/919; 356/921
(58) Field of Search ........................ 382/130, 190–195, 382/209, 217–221; 356/213, 918, 919, 921

(56) References Cited

U.S. PATENT DOCUMENTS

| 4,606,069 | A | * | 8/1986 | Johnsen | 382/243 |
| 5,933,823 | A | * | 8/1999 | Cullen et al. | 707/6 |
| 6,144,761 | A | | 11/2000 | Kaneko et al. | |
| 6,347,152 | B1 | * | 2/2002 | Shinagawa et al. | 382/195 |
| 6,493,465 | B2 | * | 12/2002 | Mori et al. | 382/209 |
| 6,591,011 | B1 | * | 7/2003 | Nielsen | 382/218 |
| 6,594,600 | B1 | * | 7/2003 | Arnoul et al. | 702/94 |
| 6,668,082 | B1 | * | 12/2003 | Davison et al. | 382/190 |
| 2002/0039438 | A1 | * | 4/2002 | Mori et al. | 382/154 |

FOREIGN PATENT DOCUMENTS

JP 10221072 8/1998

* cited by examiner

Primary Examiner—Samir Ahmed
Assistant Examiner—Brian Le
(74) Attorney, Agent, or Firm—Greenblum & Bernstein, P.L.C.

(57) ABSTRACT

A matching device comprises a monitor screen on which first and second images containing a common object are indicated. First, an arbitrary pixel, contained in the first image, is designated as a designating point. Then, four optimum searching pixels are selected from the first image. The optimum searching pixels exist close to the designating point, and have a pixel value more different from the designating point than pixel values of the other pixels around the optimum searching pixels. A candidate point and candidate point surrounding pixels, which correspond to the designating point and the optimum searching pixels, are detected in the second image.

48 Claims, 12 Drawing Sheets

FIG. 1
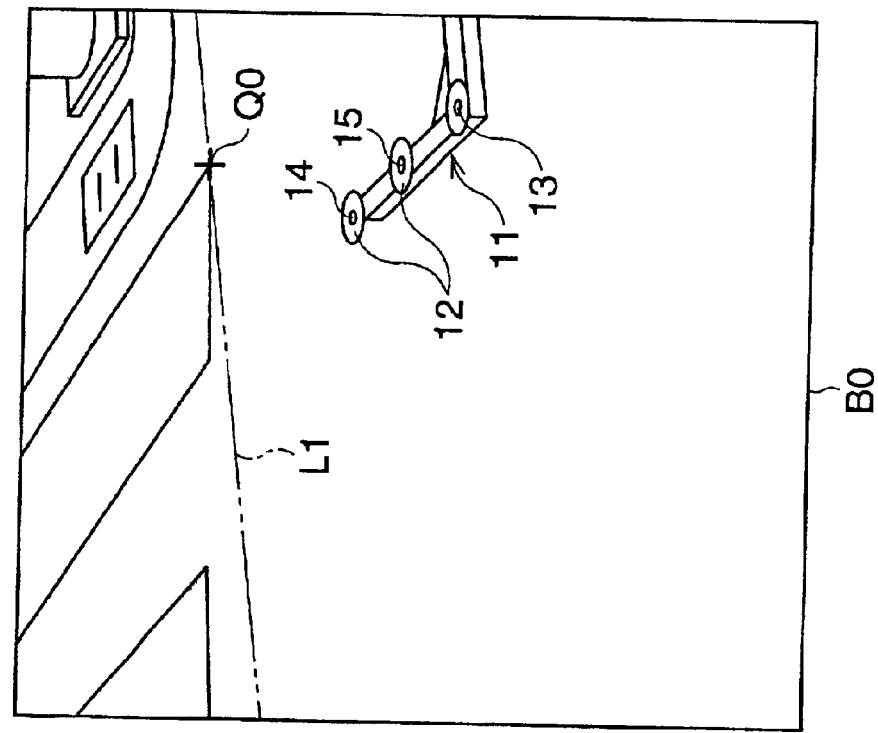
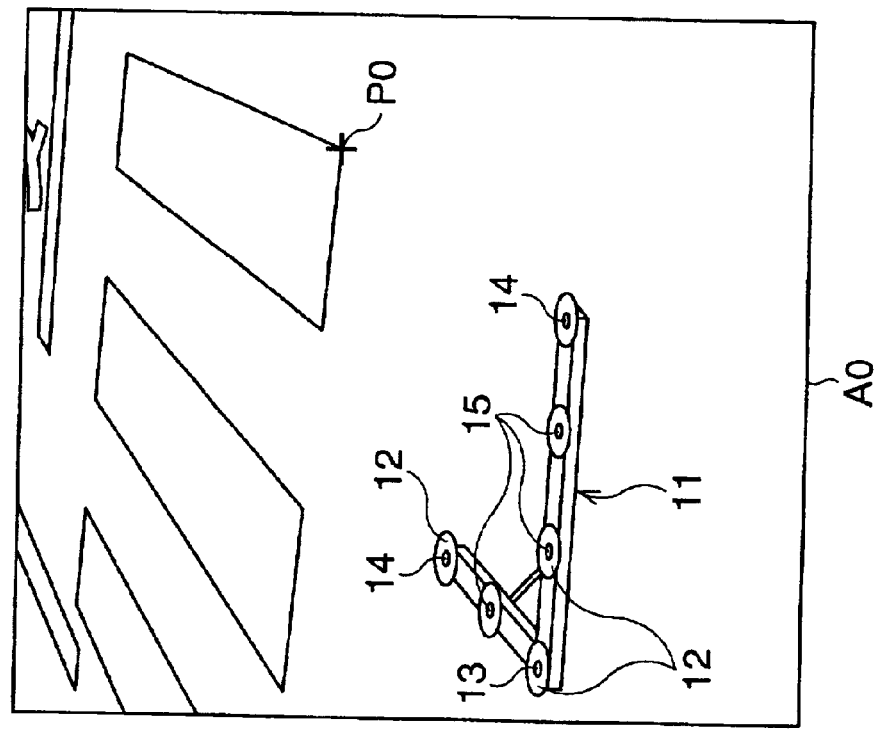

MATCHING DEVICE

BACKGROUND OF THE INVENTION

1. Field of the Invention

The present invention relates to a matching device for a pair of images, which is used in photogrammetry.

2. Description of the Related Art

In conventional photogrammetry, two images containing a common object are photographed and input to a computer, where a detecting process is performed in which, on the surface of a monitor device, a designating point contained in one of the images is selected so that the corresponding point existing on the other image is detected. In the detecting process, the designating point is selected, and thus, first, a corresponding line which is a straight line containing the corresponding point is obtained in the other image. Then, from among the pixels positioned on the corresponding line, the pixel with the value closest to that of the designating point is extracted, as the corresponding point.

In the detecting process of the corresponding point, if the corresponding point is detected from the other image based on only a single designating point selected from the first image, there may be some pixels having pixel values which are close to the pixel value of the designating point, and therefore, the correct point may not be detected.

Therefore, a method is proposed in which predetermined (n×n) pixels close to the designating point are used to detect the corresponding point. Namely, in this method, regarding each point on the corresponding line, a correlation between pixel values of (n×n) pixels surrounding the point and pixel values of (n×n) pixels surrounding the designating point is considered. In this method, however, since a lot of pixels are processed, a problem occurs, in which the process time is long.

SUMMARY OF THE INVENTION

Therefore, an object of the present invention is to provide a matching device which detects a corresponding point, corresponding to a designating point contained in one of the two images, in the other image, with a high accuracy and in a short time.

According to the present invention, there is provided a matching device for processing first and second images in which a common object is photographed, to detect a corresponding point, which is contained in the second image and which corresponds to a designating point contained in the first image. The device comprises a designating processor, a selecting processor, an obtaining processor, a calculating processor, and an extracting processor.

The designating processor designates an arbitrary pixel, contained in the first image, as the designating point. The selecting processor selects at least one optimum searching pixel from the first image. The optimum searching pixel exists close to the designating point, and has a pixel value that is more different from the designating point than pixel values of the other pixels around the optimum searching pixel. The obtaining processor obtains candidate points and candidate point surrounding pixels that correspond to the designating point and the optimum searching pixels, respectively. The candidate points and the candidate point surrounding pixels are contained in the second image. The calculating processor calculates an error based on pixel values of the designating point, the optimum searching pixel, the candidate points, and the candidate point surrounding pixels. The extracting processor extracts one of the candidate points, by which the error becomes the minimum, as the corresponding point corresponding to the designating point.

Further, according to the present invention, the selecting processor may select a plurality of optimum searching pixels from the first image in such a manner that the deviation of pixel values of the plurality of optimum searching pixels and the designating point becomes maximum. The optimum searching pixels exist close to the designating point. The obtaining processor obtains candidate points and candidate point surrounding pixels that correspond to the designating point and the optimum searching pixel, respectively. The candidate points and the candidate point surrounding pixels are contained in the second image. The calculating processor calculates error based on pixel values of the designating point, the optimum searching pixel, the candidate points, and the candidate point surrounding pixels. The extracting processor extracts one of the candidate points, by which the error becomes the minimum, as the corresponding point corresponding to the designating point.

BRIEF DESCRIPTION OF THE DRAWINGS

The objects and advantages of the present invention will be better understood from the following description, with reference to the accompanying drawings in which:

FIG. 1 is a view showing first and second images indicated on a monitor screen of a computer which is a matching device of a first embodiment of the present invention;

DESCRIPTION OF THE PREFERRED EMBODIMENTS

Figure 2:
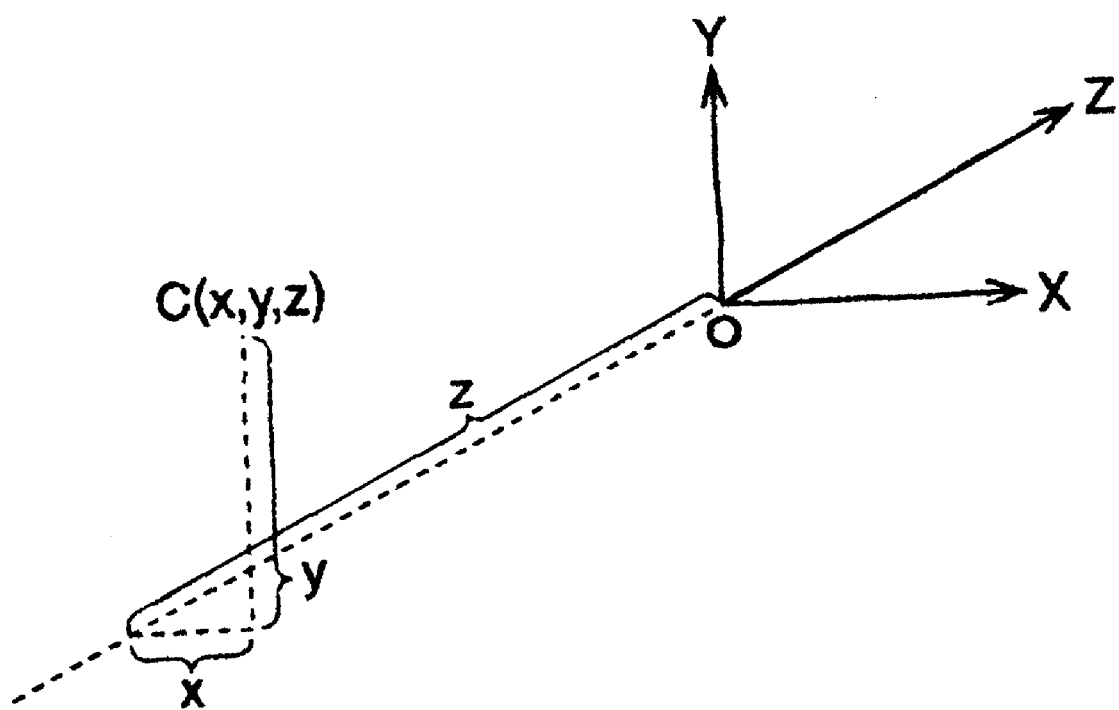
FIG. 2 is a view showing a coordinate system of the object space at the place where the first and second images have been photographed.

The present invention will be described below with reference to an embodiment shown in the drawings.

FIG. 1 shows a frame indicated on a monitor screen of a computer which is a matching device of a first embodiment of the present invention. A first image A0 is indicated on a left part of the frame, and a second image B0 is indicated on a right part of the frame. A designating point P0 is selected in the first image A0, so that a corresponding point Q0 corresponding to the designating point P0 is detected and indicated in the second image B0, due to an operation of the matching device.

The first image A0 and the second image B0 contain a target (or a standard scale) 11, which is a common object, and have been photographed from different directions. Note that, in this example, the target 11 is placed on a road surface.

The target 11 is L-shaped, and six index plates 12 are provided on an upper surface of the target 11. One of the index plates 12 is positioned at the corner of the target 11, and two of the index plates 12 are positioned at end portions of the target 11. The other index plates 12 are positioned between the corner and one of the end portions. A first standard point member 13 is provided at the center of the index plate 12 in the corner, and second standard point members 14 are provided at the centers of the index plates 12 at the end portions. Auxiliary point members 15 are provided on the other three index plates 12.

FIG. 2 shows a coordinate system of the object space at the place where the first and second images A0 and B0 have been photographed. In the coordinate system, the origin O is the center of the first standard point member 13. The X-axis is a straight line connecting the center of the first standard point member 13 and the center of the second standard point member 14 which is positioned at the right side in the first image A0. The positive direction of the X-axis is in the direction from the first standard point member 13 to the second standard point member 14. The Z-axis is a straight line connecting the center of the first standard point member 13 and the center of the second standard point member 14 which is positioned at the left side in the first image A0. The positive direction of the Z-axis is in the direction from the first standard point member 13 to the second standard point member 14. Each of the auxiliary points 15 is positioned on the X-axis or the Z-axis. The Y-axis is vertical to the X-axis and the Z-axis, and the positive direction of the Y-axis is away from the road surface.

Figure 3:
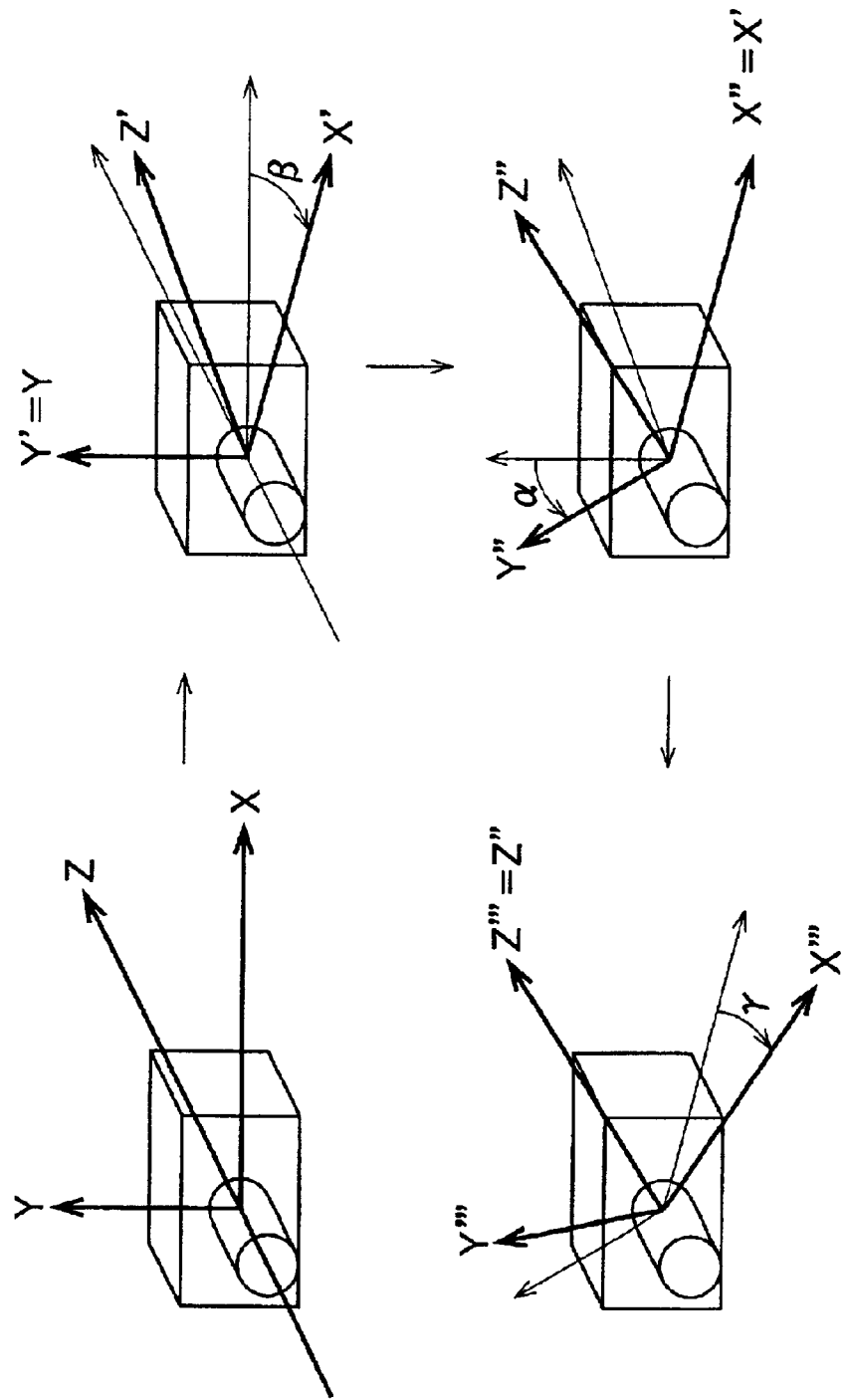
FIG. 3 is a view showing a definition of inclination of the optical axis of a photographing lens, which is an attitude of a camera.

It is supposed that the coordinates of the camera in the object space, which has taken the first and second images, are C(x,y,z). An attitude of the camera, or inclinations $(\alpha,\beta,\gamma)$ of the optical axis of the photographing lens are defined as shown in FIG. 3. Namely, $\beta$ is a rotational angle of the optical axis of the photographing lens about the Y-axis. Supposing that coordinate axes obtained by rotating the X-axis, Y-axis, and Z-axis by $\beta$ about the Y-axis are the X'-axis, Y'-axis, and Z'-axis, $\alpha$ is a rotational angle of the optical axis of the photographing lens about the X'-axis. Supposing that coordinate axes obtained by rotating the X'-axis, Y'-axis, and Z'-axis by $\alpha$ about the X'-axis are the X''-axis, Y''-axis, and Z''-axis, $\gamma$ is a rotational angle of the optical axis of the photographing lens about the Z''-axis.

Referring to FIG. 1, in the matching device, using a mouse or a keyboard, an arbitrary single pixel is selected from the first image A0, as the designating point P0. In the matching device, using a conventional method, a straight line connecting the center of a light receiving surface of an imaging device, for example, of the camera and the designating point P0 in the first image A0, is obtained as a corresponding line L1. In the second image B0, a projected view of the corresponding line L1 is indicated. Although the corresponding line L1 is a straight line containing the designating point P0 in the object space, the position of the corresponding point Q0 corresponding to the designating point P0 in the second image B0 is not specified only by obtaining the corresponding line L. In the embodiment, the corresponding point Q0 is detected using a plurality of pixels (i.e., optimum searching pixels) positioned close to the pixel of the designating point P0 in the first image A0, as will be described later.

Figure 4:
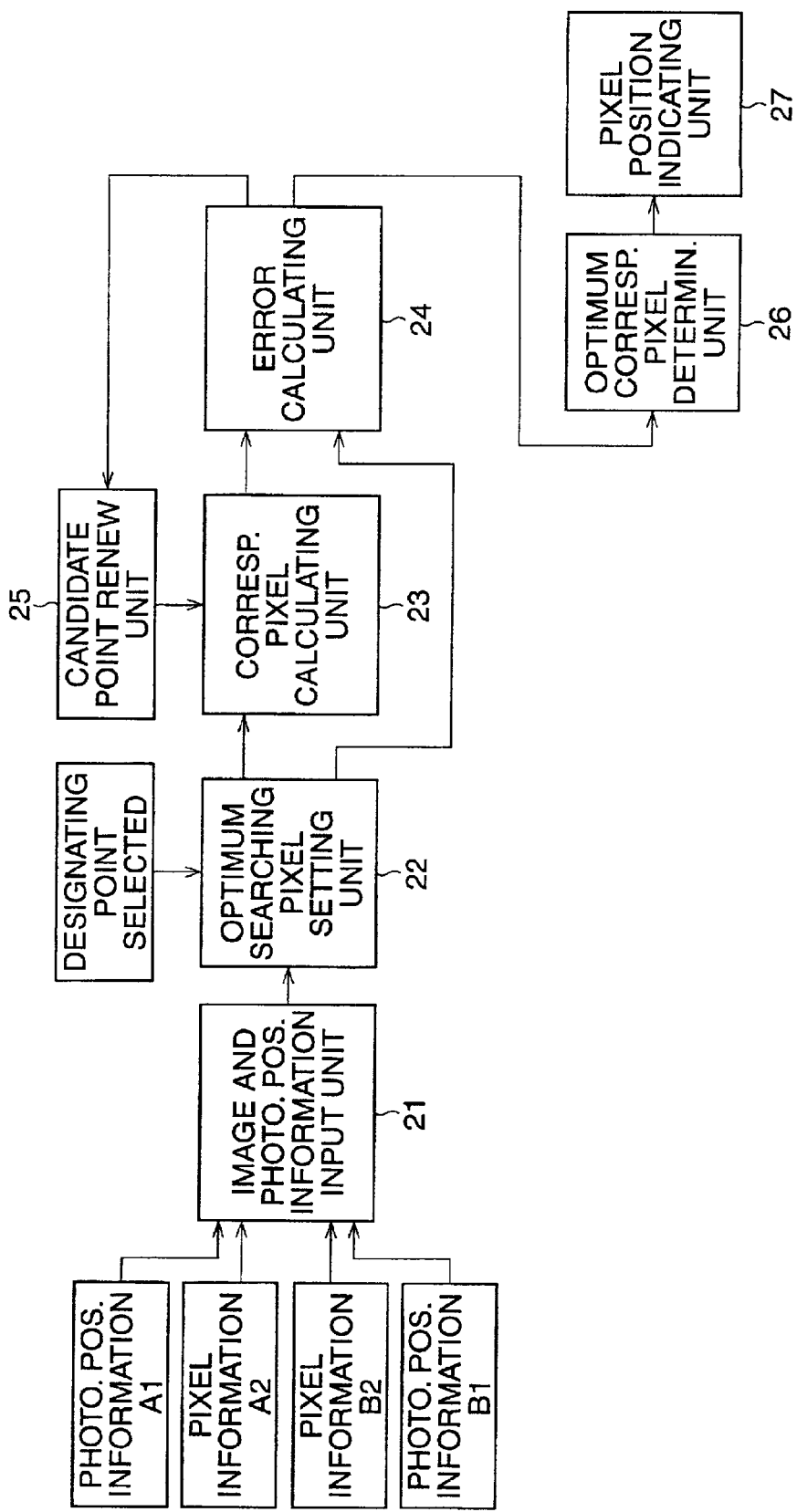
FIG. 4 is a block diagram of the matching device.

FIG. 4 is a block diagram of the matching device.

Photographing position information A1 of the camera when photographing the first image A0, pixel information A2 of the first image A0, photographing position information B1 of the camera when photographing the second image B0, and pixel information B2 of the second image B0 are input to an image and photographing position information input unit 21. The photographing position information A1 indicates a position and an attitude of the camera relative to the origin of the object space, and is indicated as CMA(x, y,z,$\alpha,\beta,\gamma$) The pixel information A2 is composed of coordinates of each pixel, and pixel values for each pixel, i.e., red, green, and blue level values, in the first image A0. The photographing position information B1 indicates a position and an attitude of the camera relative to the origin of the object space, and is indicated as CMB(x,y,z,$\alpha,\beta,\gamma$). The pixel information B2 is composed of coordinates of each pixel, and pixel values of each pixel, i.e., red, green, and blue level values in the second image B0.

The photographing position information A1 and B1, and the pixel information A2 and B2 are transmitted from the image and photographing position information input unit 21 to an optimum searching pixel setting unit 22. In the optimum searching pixel setting unit 22, optimum searching pixels, which are located around the pixel of the designating point P0, are set based on information of the designating point P0 selected from the first image A0 using the mouse or the keyboard. The optimum searching pixels are positioned in a vertical or horizontal direction relative to the designating point P0 in the first image A0, and in this embodiment, there are four optimum searching pixels which are positioned above, below, to the right of, and to the left of the designating point P0. The way in which the optimum searching pixels are obtained will be described later.

In a corresponding pixel calculating unit 23, a candidate point and candidate point surrounding pixels in the second image B0, which correspond to the designating point P0 and the optimum searching pixels, are obtained based on the pixel of the designating point P0, the optimum searching pixels set in the optimum searching pixel setting unit 22, and the information input to the image and photographing position information input unit 21. Prior to obtaining the candidate point, a corresponding line L1 in the object space, which is indicated by the following formula (1), is obtained.

$$R(x,y,z)=f(ix,iy,CMA,F,d) \qquad (1)$$

Figure 5:
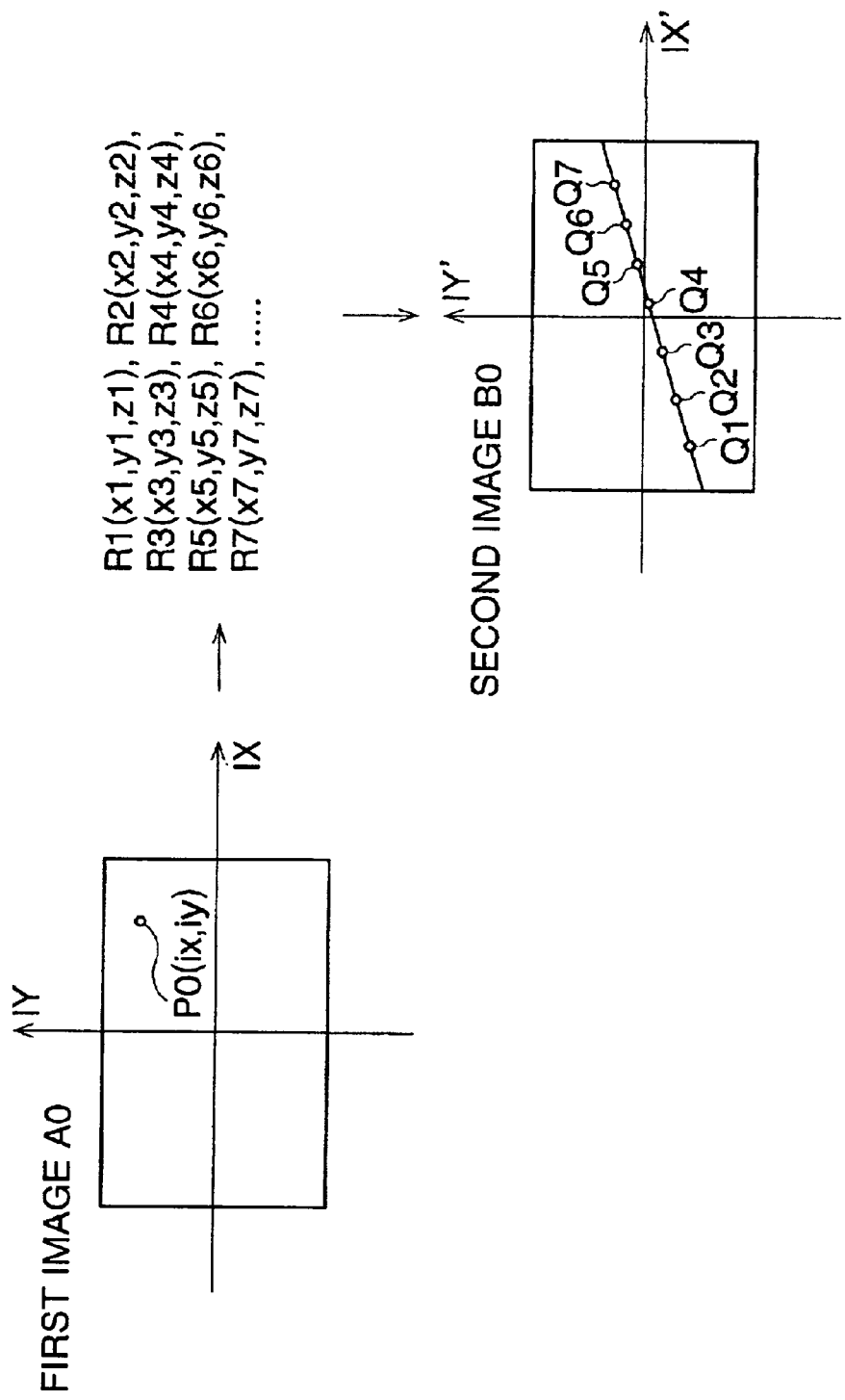
FIG. 5 is a view showing a process, in which a corresponding line which exists in object space is obtained based on a designating point in a first image, and a candidate point is then obtained.

In formula (1), ix and iy indicate the IX coordinate (horizontal coordinate) and the IY coordinate (vertical coordinate) of the designating point P0 in the first image A0, and the origin is the center of the first image A0, as shown in FIG. 5. CMA is the photographing position information A1 indicating a position and an attitude of the camera when photographing the first image A0. F is a focal length of the photographing lens of the camera. d indicates a pixel pitch of the first image A0, i.e., a distance between two pixels adjacent to each other. As understood from formula (1), the corresponding line L1 in the object space is indicated by parameters x, y, and z, and is a function of ix, iy, CMA, F, and d. Since a method by which the function, i.e. the corresponding line L1 is obtained is well known, the explanation thereof is omitted here.

Then, according to formula (2), a pixel on the corresponding line L1, i.e. coordinates of the candidate point in the second image B0, is obtained.

$$Q(kx,ky)=g(R,CMB,F,d) \qquad (2)$$

In formula (2), kx and ky indicate the IX' coordinate (horizontal coordinate) and the IY' coordinate (vertical coordinate) of the candidate point in the second image B0, and the origin is the center of the second image B0. CMB is the photographing position information B1 indicating a position and an attitude of the camera when photographing the second image B0. F is a focal length of the photographing lens of the camera. d indicates a pixel pitch of the second image B0, i.e., a distance between two pixels adjacent each other. Namely, the candidate point is indicated by parameters kx and ky, and is a function of R, CMB, F, and d. Since a method by which the function or the candidate point is obtained is well known, the explanation thereof is omitted here.

Thus, a point R1 (x1,y1,z1) on the corresponding line L1 in the object space is selected according to formula (1), and a candidate point Q1, corresponding to the point R1 (x1,y1,z1), in the second image B0 is then obtained according to formula (2). After that, regarding the candidate point Q1, candidate point surrounding pixels, which have the same positional relationship as the optimum searching pixels relative to the designating point P0, are obtained. Note that it is supposed that, in the embodiment, the point R1(x1,y1,z1) is contained in the second image B0, and is the closest point to the camera.

In an error calculating unit 24, the sum of the squares of differences between pixel values of the designating point P0 and the optimum searching pixels, which are output from the optimum searching pixel setting unit 22, and pixel values of the candidate point Q1 and the candidate point surrounding pixels, which are output from the corresponding pixel calculating unit 23, is calculated as an error. Then, in a candidate point renewing unit 25, the z-coordinate value is renewed so that the next candidate point is selected. This z-coordinate value is greater than the previous z-coordinate value, for which the candidate point Q1 is obtained, by a predetermined value. Namely, a point R2(x2,y2,z2) is selected, and thus, in the corresponding pixel calculating unit 23, the next candidate point Q2 and the candidate point surrounding pixels are obtained using the point R2(x2,y2,z2) according to formula (2). In the example shown in FIG. 5, the candidate point Q2 is located at the right side of the candidate point Q1.

In the error calculating unit 24, regarding the new candidate point Q2, an error is obtained in a similar way as the candidate point Q1. Thus, in the corresponding pixel calculating unit 23, the error calculating unit 24, and the candidate point renewing unit 25, the z-coordinate values on the corresponding line L1 in the object space are renewed and the process is performed, so that the error is obtained regarding each of the candidate points Q1, Q2 . . . Q7 on the corresponding line L1 in the second image B0.

In an optimum corresponding pixel determining unit 26, the errors, regarding all of the candidate points obtained in the error calculating unit 24, are checked, so that a candidate point, for which the error becomes minimum, is obtained as the corresponding point Q0 corresponding to the designating point P0. The corresponding point Q0 is indicated in the second image B0 on the monitor screen, through a process of a pixel position indicating unit 27 (see FIG. 1).

Figure 6:
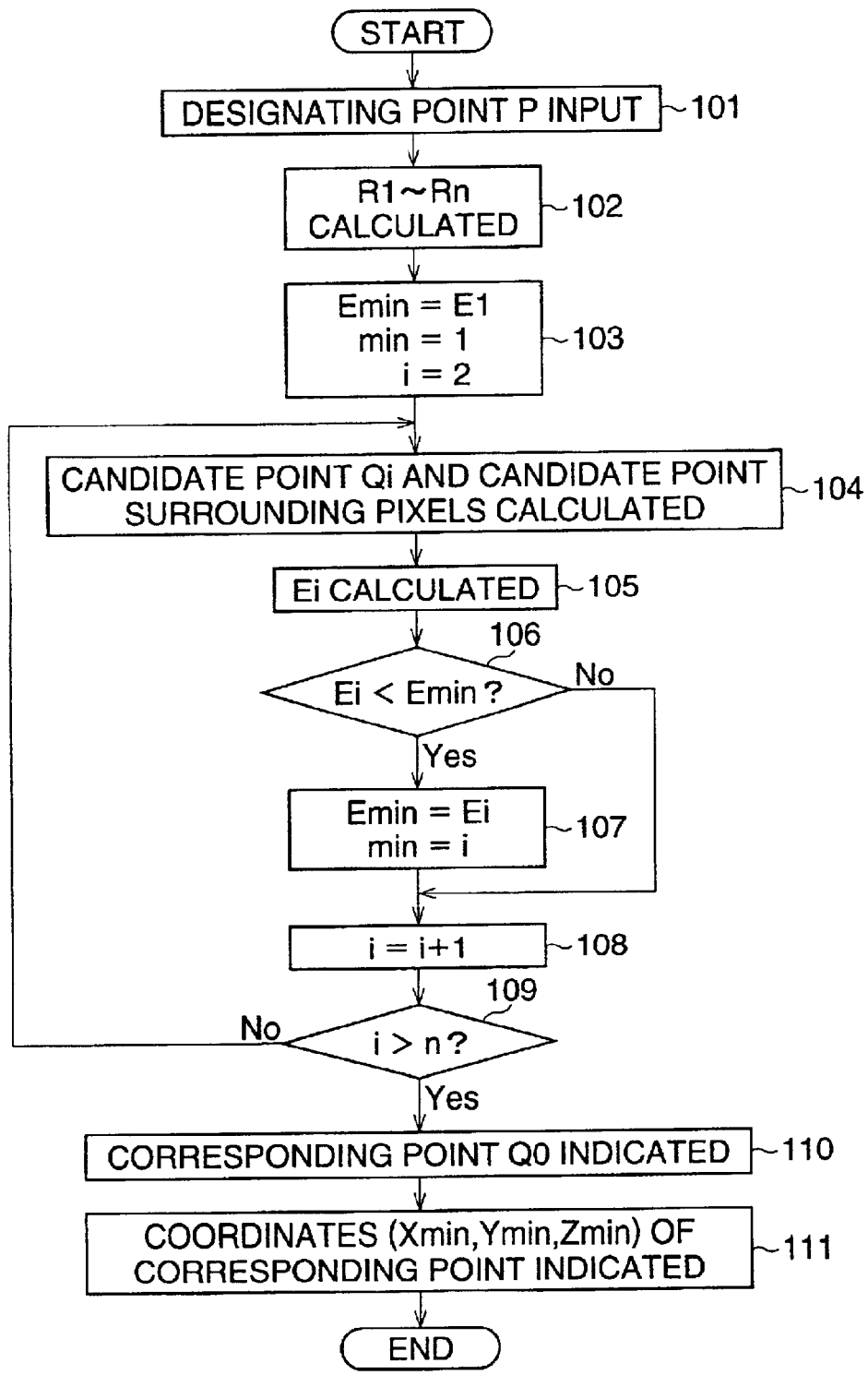
FIG. 6 is a flowchart of a process by which the corresponding point is determined based on the designating point.

FIG. 6 is a flowchart of a corresponding point determining process routine, which is performed in the corresponding pixel calculating unit 23, the error calculating unit 24, the candidate point renewing unit 25, and the optimum corresponding pixel determining unit 26, to determine the corresponding point based on the designating point.

In Step 101, information of the designating point P0 selected using the mouse or the keyboard is input. In Step 102, the corresponding line L1 is obtained according to formula (1), and a parameter z is set to a predetermined value, so that the points R1 through Rn on the corresponding line L1 are calculated. In Step 103, the minimum value $E_{min}$ of the error is set to the initial value E1, a parameter min indicating the candidate point corresponding to the minimum value $E_{min}$ is set to the initial value 1, and a counter i is set to 2.

In Step 104, the candidate point Qi corresponding to the point Ri, and the candidate point surrounding pixels are calculated according to formula (2). In Step 105, an error Ei regarding the candidate point Qi and the candidate point surrounding pixels is calculated. The calculation is performed according to the following formula (3).

$$Ei=\Sigma(PR-QRi)^2+\Sigma(PG-QGi)^2+\Sigma(PB-QBi)^2 \qquad (3)$$

In formula (3), PR, PG, and PB are pixel values of red, green, and blue components of the designating point P0 or the optimum searching pixels. QRi, QGi, and QBi are pixel values of red, green, and blue components of the candidate point Qi or the candidate point surrounding pixels. Σ indicates that the sum of squares is obtained for the designating point, the optimum searching pixels, the candidate point, and the candidate point surrounding pixels, i.e., 5 points in each image. Namely, by formula (3), the sum of the squares of the differences between the pixel values of the designating point P0 and the optimum searching pixels and the corresponding pixel values of the candidate point Qi and the candidate point surrounding pixels, regarding red, green, and blue components, is obtained.

In Step 106, it is determined whether the error Ei obtained in Step 105 is less than the minimum value $E_{min}$ obtained so far. If the error Ei is less than the minimum value $E_{min}$, Step 107 is executed in which the error Ei is renewed as the minimum value $E_{min}$ Further, in Step 107, the counter i corresponding to the error Ei is renewed as the parameter min corresponding to the minimum value $E_{min}$. Conversely, when it is determined in Step 106 that the error Ei is greater than or equal to the minimum value $E_{min}$, Step 107 is not executed.

After the execution of Step 106 or Step 107, Step 108 is executed in which the counter i is increased by 1. In Step 109, it is determined whether the value of the counter i is greater than the total number n of the candidate points. When the value of the counter i is less than or equal to the total number n of the candidate points, the process goes back to Step 104, in which the operations described above are executed again. Conversely, when it is determined in Step 109 that the value of the counter i is greater than the total number n of the candidate points, Step 110 is executed.

In Step 110, the candidate point, which has the minimum value $E_{min}$ and which was obtained in Step 107, is indicated in the second image B0 as the corresponding point Q0 (see FIG. 1). In Step 111, the coordinates $(X_{min}, Y_{min}, Z_{min})$ of the corresponding point Q0 are indicated at a predetermined position on the monitor screen, and thus the corresponding point determining process routine ends.

Figure 7:
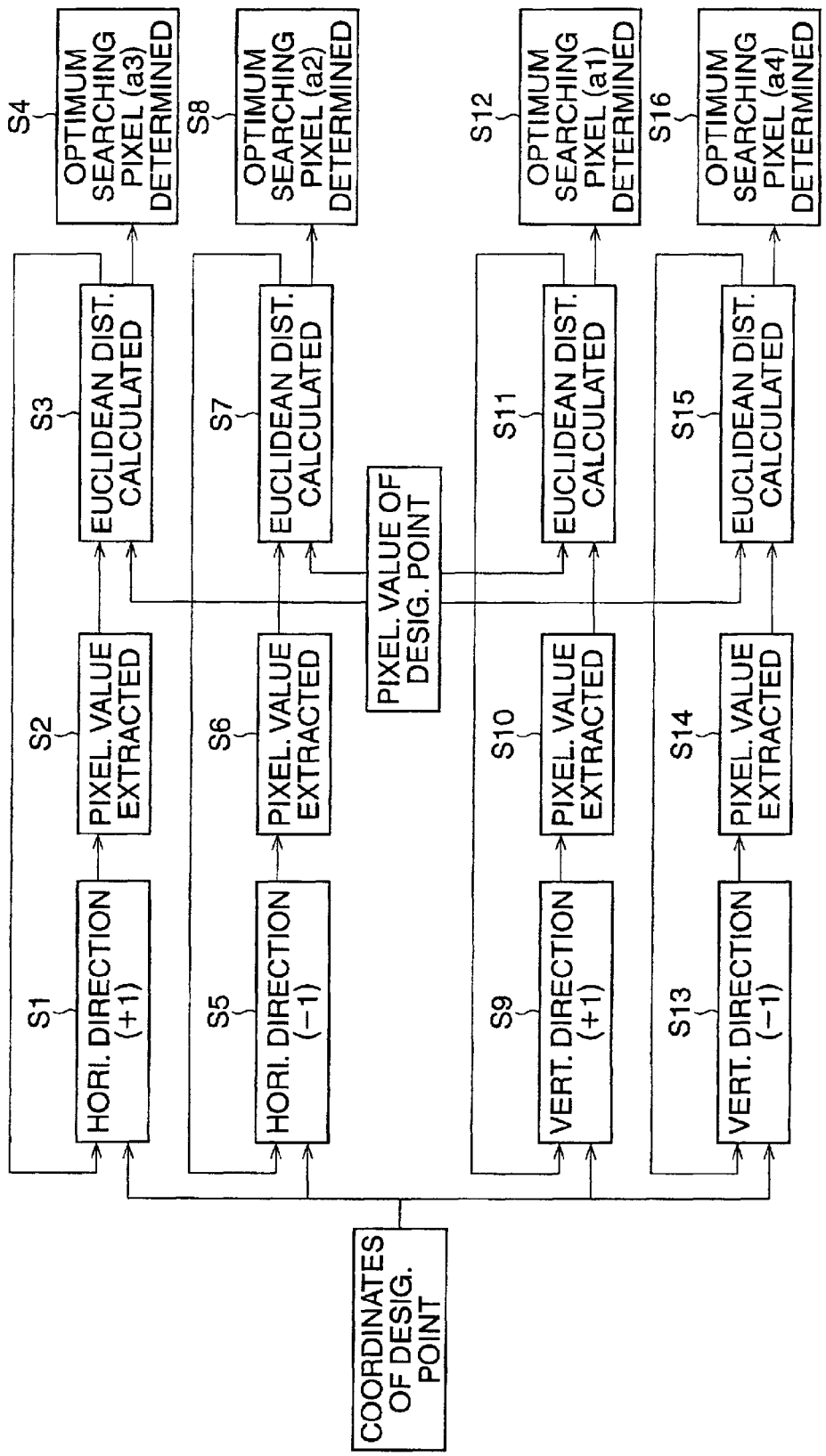
FIG. 7 is a block diagram showing a process in which optimum searching pixels are determined in an optimum searching pixel setting unit.
Figure 8:
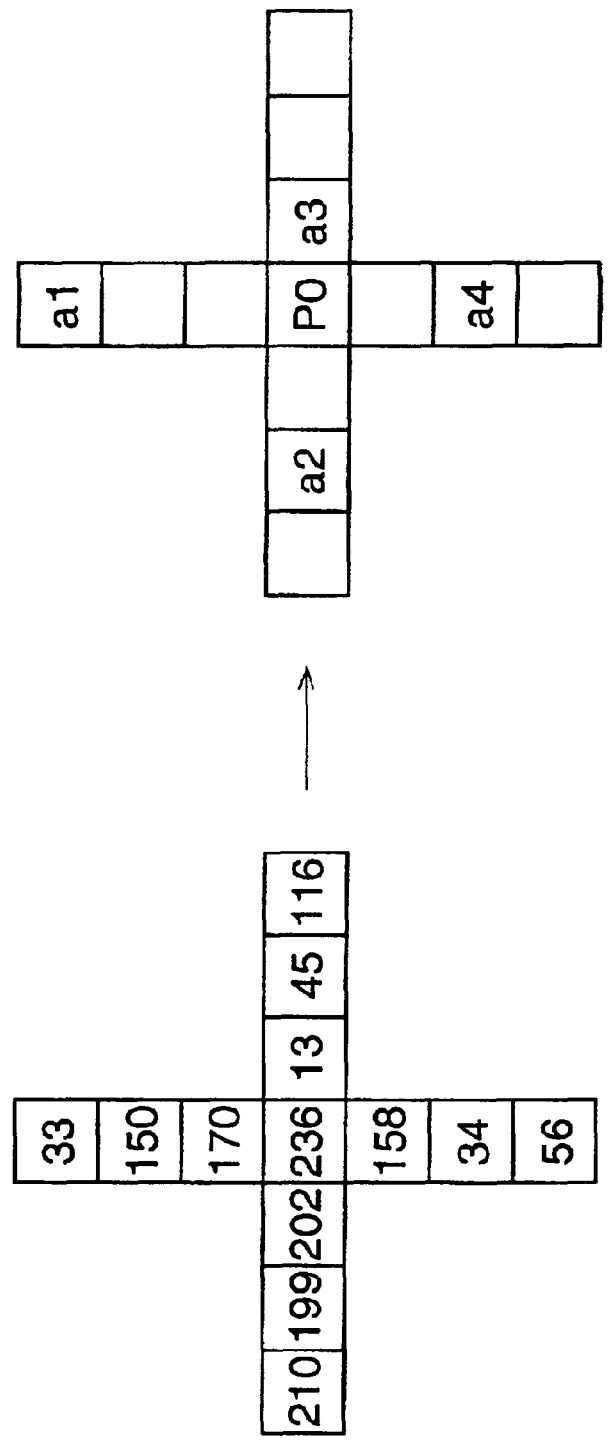
FIG. 8 is a view showing an example of pixel values of a pixel of the designating point and pixels located around the designating point, and the optimum searching pixels obtained in the optimum searching pixel setting unit.

FIG. 7 shows a process in which the optimum searching pixels are determined in the optimum searching pixel setting unit 22. FIG. 8 shows an example of pixel values of a pixel of the designating point P0 and pixels located around the designating pointP0. With reference to these drawings, a method in which the optimum searching pixels are obtained is described below.

The designating point P0 is selected using a mouse or the like, so that the coordinates (ix,iy) and the pixel value of the designating point P0 in the first image A0 are obtained. In the example shown in FIG. 8, the pixel value of the designating point P0 is 236.

First, in the first image A0, a position, which is displaced from the designating point P0 in a horizontal direction by +1 pixel, i.e., displaced in the right direction by one pixel, is obtained (reference S1), and the pixel value of the position is extracted (reference S2). The extracted pixel value is 13 in FIG. 8, and the Euclidean distance between the extracted pixel value and the pixel value of the designating point P0, i.e., the square of a difference between two pixel values is calculated (reference S3). Then, a position, which is further displaced in the horizontal direction by +1 pixel is obtained (reference S1), and the pixel value (45 in FIG. 8) of the position is newly extracted (reference S2). Regarding this pixel value, the Euclidean distance between the newly extracted pixel value and the pixel value of the designating point P0 is calculated (reference S3). Such a process is repeated, so that a pixel, for which the Euclidean distance is the maximum, is determined as the optimum searching pixel (reference S4). In the example of FIG. 8, the optimum searching pixel is the pixel a3 (=13) which is adjacent to the right side of the designating point P0.

Similarly, a position, which is displaced from the designating point P0 in a horizontal direction by −1 pixel, i.e., displaced in the left direction by one pixel, is obtained (reference S5), and the pixel value of the position is extracted (reference S6). The Euclidean distance between the extracted pixel value and the pixel value of the designating point P0 is calculated (reference S7). Then, a position, which is further displaced in the horizontal direction by −1 pixel is obtained (reference S5), and the pixel value of the position is newly extracted (reference S6). Regarding this pixel value, the Euclidean distance between the newly extracted pixel value and the pixel value of the designating point PO is calculated (reference S7). Such a process is repeated, so that the second pixel a2 (=199) from the designating point P0 to the left side in the example of FIG. 8, is determined as the optimum searching pixel (reference S8).

Then, a position, which is displaced from the designating point P0 in a vertical direction by +1 pixel, i.e., displaced in the upper direction by one pixel, is obtained (reference S9), and the pixel value of the position is extracted (reference S10). The Euclidean distance between the extracted pixel value and the pixel value of the designating point P0 is calculated (reference S11). Then, a position, which is further displaced in the vertical direction by +1 pixel is obtained (reference S9), and the pixel value of the position is newly extracted (reference S10). Regarding this pixel value, the Euclidean distance between the newly extracted pixel value and the pixel value of the designating point P0 is calculated (reference S11). Such a process is repeated, so that the third pixel a1 (=33) from the designating point P0 in the upper direction in the example of FIG. 8, is determined as the optimum searching pixel (reference S12).

Similarly, a position, which is displaced from the designating point P0 in a vertical direction by −1 pixel, i.e., displaced in the lower direction by one pixel, is obtained (reference S13), and the pixel value of the position is extracted (reference S14). The Euclidean distance between the extracted pixel value and the pixel value of the designating point P0 is calculated (reference S15). Then, a position, which is further displaced in the vertical direction by −1 pixel is obtained (reference S13), and the pixel value of the position is newly extracted (reference S14). Regarding this pixel value, the Euclidean distance between the newly extracted pixel value and the pixel value of the designating point P0 is calculated (reference S15). Such a process is repeated, so that the second pixel a4 (=34) from the designating point P0 in the lower direction in the example of FIG. 8, is determined as the optimum searching pixel (reference S16).

Figure 9:
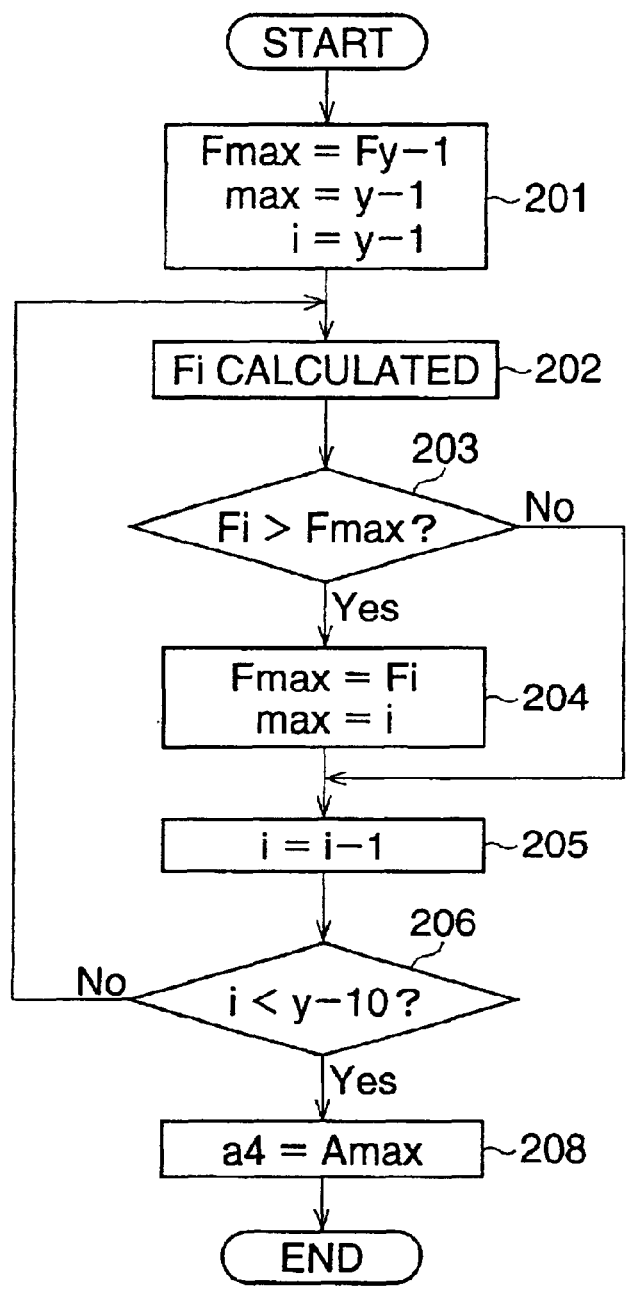
FIG. 9 is a flowchart of an optimum searching pixel determining process routine.

FIG. 9 is a flowchart of an optimum searching pixel determining process routine, which is executed in the optimum searching pixel setting unit 22. Note that only a process, by which the pixel a4 located below the designating point P0 is obtained, is shown in FIG. 9, and the other processes for obtaining the other pixels a1, a2, and a3 are omitted. Further note that, in the following description, the y-axis extends in a vertical direction in FIG. 8, and the upper direction is positive.

In Step 201, a maximum value $F_{max}$ of an evaluation value Fi, described later, is set to the initial value $F_{y-1}$, a parameter max indicating a position of a pixel corresponding to the maximum value $F_{max}$ is set to the initial value (y−1), and a counter i is set to the initial value (y−1).

In Step 202, the evaluation value Fi of an i-th pixel below the designating point P0 is calculated according to the following formula (4).

$$Fi=(PR-ARi)^2+(PG-AGi)^2+(PB-ABi)^2 \qquad (4)$$

In formula (4), PR, PG, and PB are pixel values of red, green, and blue components of the designating point P0. ARi, AGi, and ABi are pixel values of red, green, and blue components of the i-th pixel. Namely, by formula (4), the sum of the squares of the differences between the pixel value of the designating point P0 and the pixel value of the i-th pixel, regarding red, green, and blue components is obtained.

In Step 203, it is determined whether the evaluation value Fi obtained in Step 202 is greater than the maximum value $F_{max}$ obtained previously. If the evaluation value Fi is greater than the maximum value $F_{max}$, Step 204 is executed in which the evaluation value Fi is renewed as the maximum value $F_{max}$, and the counter i corresponding to the evaluation value Fi is renewed as the parameter max corresponding to the maximum value $F_{max}$. Conversely, when it is determined in Step 203 that the evaluation value Fi is less than or equal to the maximum value $F_{max}$, Step 204 is not executed.

After the execution of Step 203 or Step 204, Step 205 is executed in which the counter i is decreased by 1. In Step 206, it is determined whether the value of the counter i is less than the limit value (y−10) of the range within which an optimum searching pixel is to be selected. When the value of the counter i is greater than or equal to the limit value (y−10), i.e., when the counter i indicates a pixel closer to the designating point P0 than the limit value, the process goes back to Step 202, so that the operations described above are executed again. Conversely, when it is determined that the value of the counter i is less than the limit value (y−10), or when the counter i indicates a pixel below the limit value, Step 208 is executed.

In Step 208, the pixel a4, indicating the maximum value $F_{max}$ obtained in Step 204, is determined as the optimum searching pixel located below the designating point P0, and is indicated at a predetermined position on the monitor screen. Thus, this routine ends.

In the first embodiment, as clearly shown in FIG. 8, the four pixels, which are as largely different from the designating point P0 as possible, are selected from the pixels located in the vertical and horizontal directions of the designating point P0, as the optimum searching pixels. Therefore, the pixels, which have characteristics close to those of the designating point P0 and the pixels around the designating point P0, are detected as the corresponding point Q0. Accordingly, the corresponding point Q0 corresponding to the designating point P0 is accurately detected. Further, only four pixels are used for representing characteristics of pixels surrounding the designating point, and therefore, the period of time required for detecting the corresponding point Q0 is short in comparison with the case in which (4×4) pixels are used.

Figure 10:
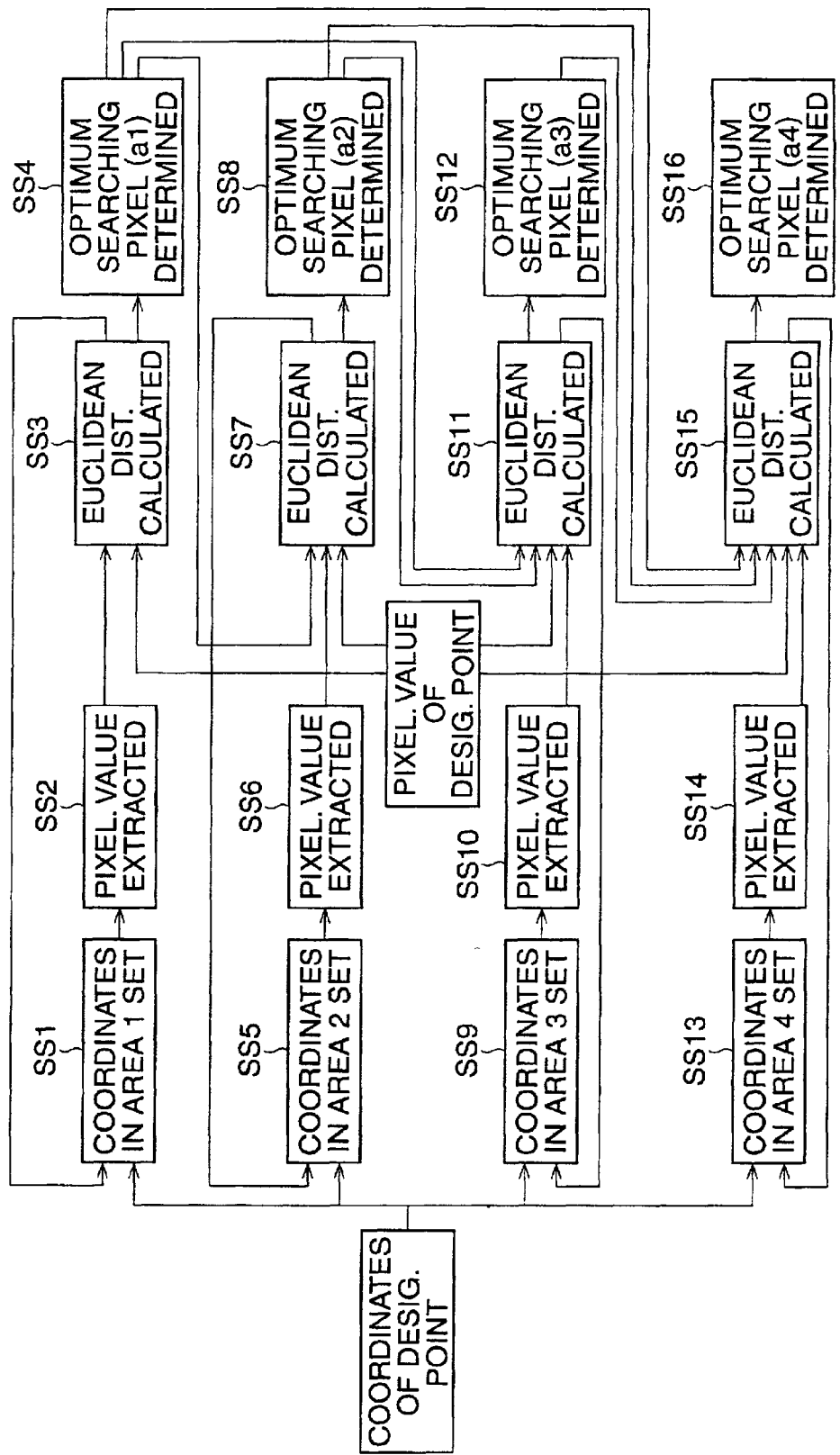
FIG. 10 is a block diagram of a second embodiment, showing a process in which the optimum searching pixels are determined in the optimum searching pixel setting unit.
Figure 11:
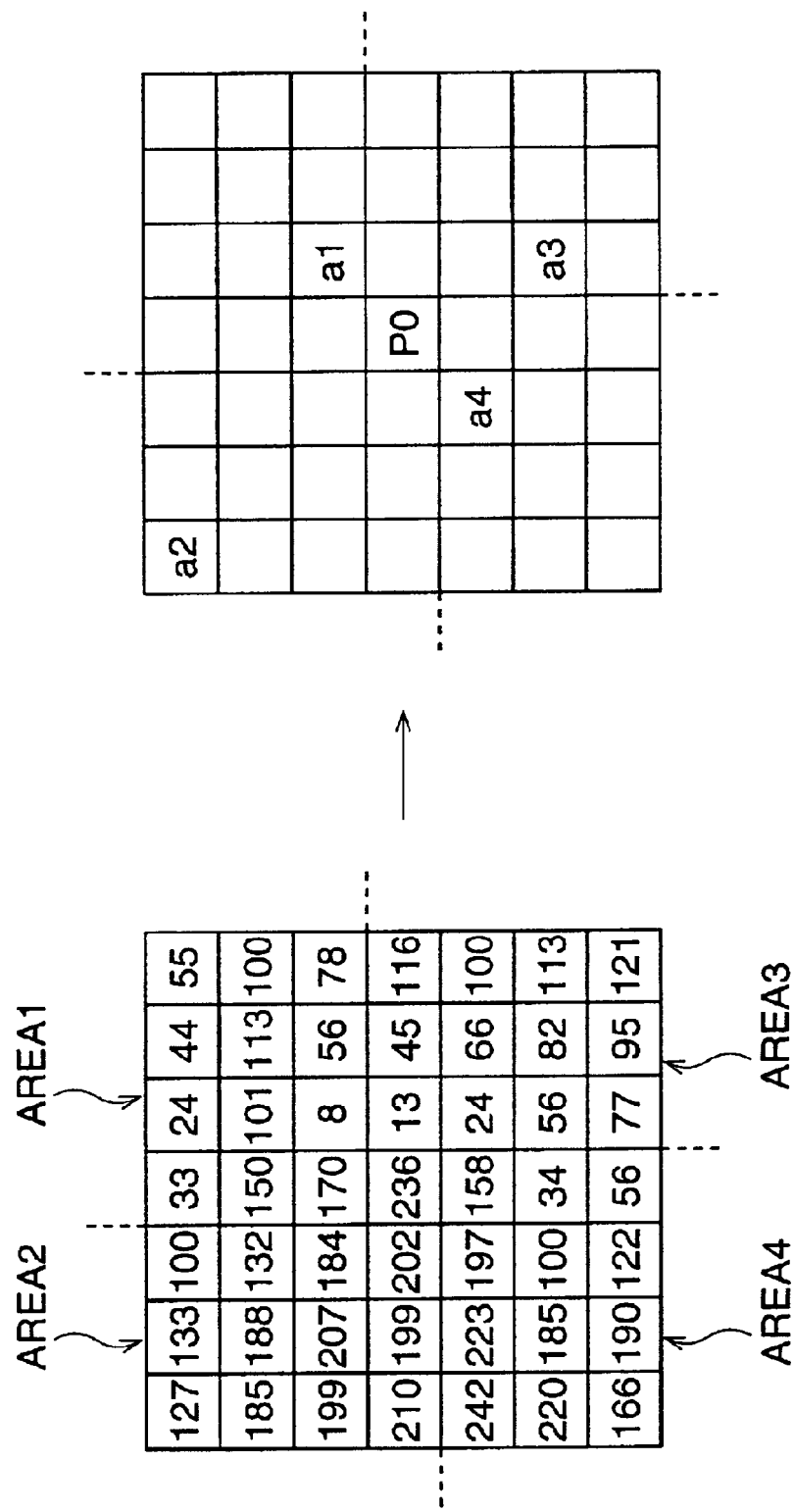
FIG. 11 is a view showing an example of pixel values of a pixel of the designating point P0 and pixels located around the designating point, and the optimum searching pixels obtained in the optimum searching pixel setting unit, in the second embodiment.

A second embodiment of the present invention is described below. FIG. 10 shows a process in which the optimum searching pixels are determined in the optimum searching pixel setting unit 22 (see FIG. 4). FIG. 11 shows an example of pixel values of a pixel of the designating point P0 and pixels located around the designating point P0. With reference to these drawings, a method in which the optimum searching pixels are obtained in the second embodiment is described below.

The designating point P0 is selected using a mouse and the like, so that the coordinates (ix,iy) and the pixel value of the designating point P0 in the first image A0 are obtained. In the example shown in FIG. 11, the pixel value of the designating point P0 is 236.

Regarding the first image A0, four Areas 1–4 adjacent to the designating point P0 are defined. Area 1 is defined in such a manner that the left-lower corner is the pixel (170), which is immediately above the designating point P0. Area 2 is defined in such a manner that the right-lower corner is the pixel (202), which is immediately at the left side of the designating point P0. Area 3 is defined in such a manner that the left-upper corner is the pixel (13), which is immediately at the right side of the designating point P0. Area 4 is defined in such a manner that the right-upper corner is the pixel (158), which is immediately under the designating point P0.

First, regarding Area 1, coordinates of a pixel adjoining the upper side of the designating point P0 are set (reference SS1), and the pixel value is extracted (reference SS2). The extracted pixel value is 170 in FIG. 11, and the Euclidean distance between the extracted pixel value and the pixel value of the designating point P0, i.e., the square of a difference between two pixel values is calculated (reference SS3). Then, a position, which is displaced in the horizontal direction by +1 pixel is obtained (reference SS1), and the pixel value (8 in FIG. 11) of the position is newly extracted (reference SS2). Regarding this pixel value, the Euclidean distance between the newly extracted pixel value and the pixel value of the designating point P0 is calculated (reference SS3).

Euclidean distance is calculated according to the following formula (5).

$$Fik = (PR-ARik)^2 + (PG-AGik)^2 + (PB-ABik)^2 \quad (5)$$

In formula (5), PR, PG, and PB are pixel values of red, green, and blue components at the designating point P0. ARik, AGik, and ABik are pixel values of red, green, and blue components at the pixel of the coordinates (i,k). Namely, according to formula (5), regarding red, green, and blue components, the sum of differences of the pixel values of the designating point P0 and pixels (i,k) is obtained.

When the calculations of formula (5) are completed up to the limit position in the horizontal direction, the process is then performed again for a line positioned vertically above the previous line by one pixel. Thus, when the process is completed up to the limit position of the vertical direction, the pixel, for which the Euclidean distance is the maximum, is determined as the optimum searching pixel in Area 1 (reference SS4). The optimum searching pixel of Area 1 is the pixel a1 (=8) adjoining the right and upper side of the designating point P0 in FIG. 11.

Next, regarding Area 2, coordinates of a pixel adjoining the left side of the designating point P0 are set (reference SS5), and the pixel value is extracted (reference SS6). The product of the Euclidean distance between the extracted pixel value and the pixel value of the designating point P0, and the Euclidean distance between the extracted pixel value and the pixel value of the optimum searching pixel in Area 1, is calculated (reference SS7). Then, a position, which is displaced in the horizontal direction by −1 pixel is obtained (reference SS5), and the pixel value of the position is newly extracted (reference SS6). Regarding this pixel value, the product of the two Euclidean distances is calculated (reference SS7).

The product of the two Euclidean distances is calculated according to the following formula (6).

$$Fik = ((PR-ARik)^2 + (PG-AGik)^2 + (PB-ABik)^2) \times ((A1R-ARik)^2 + (A1G-AGik)^2 + (A1B-ABik)^2) \quad (6)$$

In formula (6), A1R, A1G, and A1B are pixel values of red, green, and blue components of the optimum searching pixel in Area 1.

When the calculations of formula (6) are completed up to the limit position in the horizontal direction, the same process is performed for a line positioned vertically above the previous line by one pixel. Thus, when the process is completed up to the limit position of the vertical direction, the pixel, for which the product of the two Euclidean distances is the maximum, is determined as the optimum searching pixel in Area 2 (reference SS8). The optimum searching pixel of Area 2 is the pixel a2 (=127) positioned at the upper-left side of the designating point P0 in FIG. 11.

In a similar way to the above, regarding Area 3, coordinates of a pixel adjoining the right side of the designating point P0 are set (reference SS9), and the pixel value is extracted (reference SS10). The product of the Euclidean distance between the extracted pixel value and the pixel value of the designating point P0, the Euclidean distance between the extracted pixel value and the pixel value of the optimum searching pixel of Area 1, and the Euclidean distance between the extracted pixel value and the pixel value of the optimum searching pixel of Area 2, is calculated (reference SS11). Then, a position, which is displaced in the horizontal direction by +1 pixel is obtained (reference SS9), and the pixel value of the position is newly extracted (reference SS10). Regarding this pixel value, the product of the three Euclidean distances is calculated (reference SS11).

The product of the three Euclidean distances is obtained from the following formula (7).

$$Fik = ((PR-ARik)^2 + (PG-AGik)^2 + (PB-ABik)^2) \times ((A1R-ARik)^2 + (A1G-AGik)^2 + (A1B-ABik)^2) \times ((A2R-ARik)^2 + (A2G-AGik)^2 + (A2B-ABik)^2) \quad (7)$$

In formula (7), A2R, A2G, and A2B are pixel values of red, green, and blue components of the optimum searching pixel in Area 2.

When the calculations of formula (7) are completed up to the limit position in the horizontal direction, the same process is performed for a line positioned vertically under the previous line by one pixel. Thus, when the process is completed up to the limit position of the vertical direction, the pixel, for which the product of the three Euclidean distances is the maximum, is determined as the optimum searching pixel in Area 3 (reference SS12). The optimum searching pixel of Area 3 is the pixel a3 (=56) positioned at the lower-right side of the designating point P0 in FIG. 11.

In a similar way to the above, regarding Area 4, coordinates of a pixel adjoining the lower side of the designating point P0 are set (reference SS13), and the pixel value is extracted (reference SS14). The product of the Euclidean distance between the extracted pixel value and the pixel value of the designating point P0, the Euclidean distance between the extracted pixel value and the pixel value of the optimum searching pixel of Area 1, the Euclidean distance between the extracted pixel value and the pixel value of the optimum searching pixel of Area 2, and the Euclidean distance between the extracted pixel value and the pixel value of the optimum searching pixel of Area 3, is calculated (reference SS15). Then, a position, which is displaced in the horizontal direction by −1 pixel is obtained (reference SS13), and the pixel value of the position is newly extracted (reference SS14). Regarding this pixel value, the product of the four Euclidean distances is calculated (reference SS15).

The product of the four Euclidean distances is calculated according to the following formula (8).

$$Fik=((PR-ARik)^2+(PG-AGik)^2+(PB-ABik)^2)\times$$
$$((A1R-ARik)^2+(A1G-AGik)^2+(A1B-ABik)^2)\times$$
$$((A2R-ARik)^2+(A2G-AGik)^2+(A2B-ABik)^2)\times$$
$$((A3R-ARik)^2+(A3G-AGik)^2+(A3B-ABik)^2) \qquad (8)$$

In formula (8), A3R, A3G, and A3B are pixel values of red, green, and blue components of the optimum searching pixel in Area 3.

When the calculations of formula (8) are completed up to the limit position in the horizontal direction, the same process is performed for a line positioned vertically under the previous line by one pixel. Thus, when the process is completed up to the limit position of the vertical direction, the pixel, for which the product of the four Euclidean distances is the maximum, is determined as the optimum searching pixel in Area 4 (reference SS16). The optimum searching pixel of Area 4 is the pixel a4 (=197) adjoining the left and lower side of the designating point P0 in FIG. 11.

Figure 12:
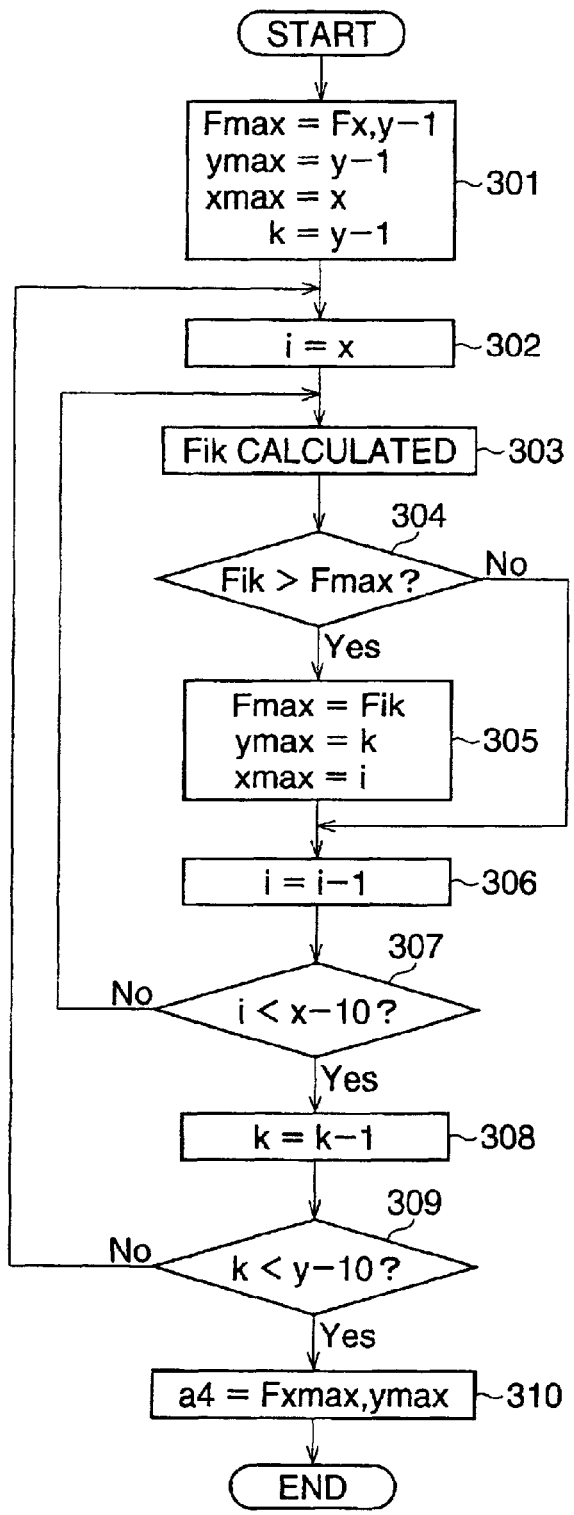
FIG. 12 is a flowchart of an optimum searching pixel determining process routine of the second embodiment.

FIG. 12 is a flowchart of an optimum searching pixel determining process routine, which is executed in the optimum searching pixel setting unit 22. Note that only a process, by which the optimum searching pixel a4 in Area 4 is obtained, is shown in FIG. 12, and the optimum searching pixels in the other Areas are obtained by similar processes as shown in FIG. 12. Further note that, in the following description, the x-axis extends in a horizontal direction in FIG. 11, and the right direction is positive. The y-axis extends in a vertical direction in FIG. 11, and this upper direction is positive.

In Step 301, a maximum value $F_{max}$ of the product of the Euclidean distance obtained by formula (8) is set to the initial value $F_{x,y-1}$, a parameter ymax indicating the y-coordinate of a pixel corresponding to the maximum value $F_{max}$ is set to the initial value (y−1), a parameter xmax indicating the x-coordinate of a pixel corresponding to the maximum value $F_{max}$ is set to the initial value (x), and a counter k is set to the initial value (y−1).

In Step 302, a counter i is set to the initial value x. In Step 303, the product Fik of the Euclidean distance at a pixel of coordinates (x,y−1) is calculated according to formula (8).

In Step 304, it is determined whether the product Fik obtained in Step 303 is greater than the maximum value $F_{max}$ obtained so far. If the product Fik is greater than the maximum value $F_{max}$, Step 305 is executed in which the product Fik is renewed as the maximum value $F_{max}$. Further, in Step 305, the y-coordinate (k) corresponding to the product Fik is renewed as the parameter ymax, and the x-coordinate (i) is renewed as the parameter xmax. Conversely, when it is determined in Step 304 that the product Fik is less than or equal to the maximum value $F_{max}$, Step 305 is not executed.

After the execution of Step 304 or Step 305, Step 306 is executed in which the counter i is decreased by 1. In Step 307, it is determined whether the value of the counter i is less than the limit value (x−10) of the range of the x-coordinates within which an optimum searching pixel is to be selected. When the value of the counter i is greater than or equal to the limit value (x−10), or when the counter i indicates a pixel closer to the designating point P0 than the limit value, the process goes back to Step 303, in which the operations described above are executed again. Conversely, when it is determined that the value of the counter i is less than the limit value (x−10), or when the counter i indicates a pixel on the left side of the limit value, Step 308 is executed.

In Step 308, the counter k is decreased by 1. In Step 309, it is determined whether the value of the counter k is less than the limit value (y−10) of the range of the y-coordinates within which the optimum searching pixel is to be selected. When the value of the counter k is greater than or equal to the limit value (y−10), or when the counter k indicates a pixel closer to the designating point P0 than the limit value, the process goes back to Step 302, in which the operations described above are executed again. Conversely, when it is determined that the value of the counter k is less than the limit value (y−10), or when the counter k indicates a pixel on the lower side of the limit value, Step 310 is executed.

In Step 310, the pixel a4, indicating the maximum value $F_{max}$ obtained in Step 305, is determined as the optimum searching pixel in Area 4, and is indicated at a predetermined position on the monitor screen. Thus, this routine ends.

In the second embodiment, as clearly shown in FIG. 11, the optimum searching pixels are extracted from four Areas, in such a manner that variations of the pixel values of the designating point P0 and the pixels contained in four Areas located around the designating point P0 become the maximum. Therefore, the pixels, which have characteristics close to those of the designating point P0 and the pixels around the designating point P0, are detected as the corresponding point Q0. Accordingly, the corresponding point Q0 corresponding to the designating point P0 is accurately detected. Further, only four pixels are used to represent characteristics of pixels surrounding the designating point, and therefore, the period of time required for detecting the corresponding point Q0 is short in comparison with a case in which all of the (n×n) pixels are used.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 2000-275816 and 2000-276113 (both filed on Sep. 12, 2000) which are expressly incorporated herein, by reference, in their entireties.

What is claimed is:

1. A matching device for processing first and second images in which a common object is photographed, to detect a corresponding point, which is contained in said second image and corresponds to a designating point contained in said first image, said device comprising:

means for designating an arbitrary pixel, contained in said first image, as said designating point;

means for selecting at least one optimum searching pixel from said first image, said optimum searching pixel existing close to said designating point, and having a pixel value more different from said designating point than pixel values of the other pixels around said optimum searching pixel;

means for obtaining candidate points and candidate point surrounding pixels that correspond to said designating point and said optimum searching pixel, respectively, said candidate points and said candidate point surrounding pixels being contained in said second image;

means for calculating an error based on pixel values of said designating point, said optimum searching pixel, said candidate points, and said candidate point surrounding pixels; and means for extracting one of said candidate points, by which said error becomes the minimum, as said corresponding point corresponding to said designating point.

2. A device according to claim 1, wherein said optimum searching pixel is positioned either above, below, to the right of, or to the left of said designating point in said first image.

3. A device according to claim 2, wherein said optimum searching pixels comprises four pixels, which are positioned above, below, to the right of, and to the left of said designating point in said first image.

4. A device according to claim 1, wherein said optimum searching pixel selecting means selects said optimum searching pixel in such a manner that the square of a difference between a pixel value of said designating point and a pixel value of said optimum searching pixel becomes maximum.

5. A device according to claim 1, wherein said optimum searching pixel selecting means selects said optimum searching pixel in such a manner that, regarding red, green, and blue components, the sum of the squares of differences between a pixel value of said designating point and a pixel value of said optimum searching pixel becomes maximum.

6. A device according to claim 1, further comprising means for inputting pixel information regarding pixel values and coordinates of each pixel in said first and second images, and photographing position information regarding a photographing position and an attitude of a camera when photographing said first and second images.

7. A device according to claim 6, wherein said candidate point obtaining means comprises:

means for obtaining a corresponding line, which is a straight line corresponding to said designating point in the object space, using the coordinate of said designate point in said first image, and said photographing position information of said camera when photographing said first image; and means for obtaining said candidate points, using the coordinates of a point on said corresponding line in the object space, and said photographing position information of said camera when photographing said second image.

8. A device according to claim 7, wherein said corresponding line obtaining means obtains said corresponding line, based on the coordinates of said designating point, said photographing position information of said camera when photographing said first image, a focal length of said camera, and a pixel pitch of said first image.

9. A device according to claim 7, wherein said candidate point obtaining means obtains said candidate points, based on the coordinates of a point on said corresponding line in the object space, said photographing position information of said camera when photographing said second image, a focal length of said camera, and a pixel pitch of said second image.

10. A device according to claim 7, wherein said corresponding line comprises a straight line passing through said designating point and a predetermined point in said camera.

11. A device according to claim 1, wherein said error calculating means calculates the sum of the squares of the differences between the pixel values of said designating point and said optimum searching pixels and the corresponding pixel values of said candidate point and said candidate point surrounding pixels as said error.

12. A device according to claim 11, wherein said error calculating means calculates the sum, regarding red, green, and blue components.

13. A matching device for processing first and second images in which a common object is photographed, to detect a corresponding point, which is contained in said second image and corresponds to a designating point contained in said first image, said device comprising:

means for designating an arbitrary pixel, contained in said first image, as said designating point;

means for selecting a plurality of optimum searching pixels from said first image in such a manner that the deviation of pixel values of said plurality of optimum searching pixels and said designating point becomes maximum, said optimum searching pixels existing close to said designating point;

means for obtaining candidate points and candidate point surrounding pixels that correspond to said designating point and said optimum searching pixel, respectively, said candidate points and said candidate point surrounding pixels being contained in said second image;

means for calculating an error based on pixel values of said designating point, said optimum searching pixel, said candidate points, and said candidate point surrounding pixels; and means for extracting one of said candidate points, by which said error becomes the minimum, as said corresponding point corresponding to said designating point.

14. A device according to claim 13, wherein said optimum searching pixels are contained in a plurality of areas, which are positioned around said designating point in said first image.

15. A device according to claim 14, wherein said optimum searching pixels comprise four pixels, which are positioned at the upper-right, upper-left, lower-right, and lower-left sides relative to said designating point in said first image.

16. A device according to claim 13, wherein said optimum searching pixel selecting means selects said plurality of optimum searching pixels in such a manner that the sum of the squares of the differences between the pixel value of said designating point and the pixel values of said optimum searching pixels becomes maximum.

17. A device according to claim 16, wherein said optimum searching pixel selecting means calculates the sum, regarding red, green, and blue components.

18. A device according to claim 13, further comprising means for inputting pixel information regarding pixel values and coordinates of each pixel in said first and second images, and photographing position information regarding a photographing position and an attitude of a camera when photographing said first and second images.

19. A device according to claim 18, wherein said candidate point pixel obtaining means comprises:
   means for obtaining a corresponding line, which is a straight line corresponding to said designating point in the object space, using the coordinates of said designating point in said first image, and said photographing position information of said camera when photographing said first image; and
   means for obtaining said candidate points, using the coordinates of a point on said corresponding line in the object space, and said photographing position information of said camera when photographing said second image.

20. A device according to claim 19, wherein said corresponding line obtaining means obtains said corresponding line, based on the coordinates of said designating point, said photographing position information of said camera when photographing said first image, a focal length of said camera, and a pixel pitch of said first image.

21. A device according to claim 19, wherein said candidate point obtaining means obtains said candidate points, based on the coordinates of a point on said corresponding line in the object space, said photographing position information of said camera when photographing said second image, a focal length of said camera, and a pixel pitch of said second image.

22. A device according to claim 19, wherein said corresponding line comprises a straight line passing through said designating point and a predetermined point in said camera.

23. A device according to claim 13, wherein said error calculating means calculates the sum of the squares of the differences between the pixel values of said designating point and said optimum searching pixels and the corresponding pixel values of said candidate point and said candidate point surrounding pixels, as said error.

24. A device according to claim 23, wherein said error calculating means calculates the sum, regarding red, green, and blue components.

25. A matching device for processing first and second images in which a common object is photographed, to detect a corresponding point, which is contained in said second image and corresponds to a designating point contained in said first image, said device comprising:
   a designator configured to designate an arbitrary pixel, contained in said first image, as said designating point;
   a selector configured to select at least one optimum searching pixel from said first image, said optimum searching pixel existing proximate said designating point, and having a pixel value more different from said designating point than pixel values of the other pixels around said optimum searching pixel;
   an obtaining device configured to obtain candidate points and candidate point surrounding pixels that correspond to said designating point and said optimum searching pixel, respectively, said candidate points and said candidate point surrounding pixels being contained in said second image;
   a calculator configured to calculate an error based on pixel values of said designating point, said optimum searching pixel, said candidate points, and said candidate point surrounding pixels; and
   an extractor configured to extract one of said candidate points, by which said error becomes the minimum, as said corresponding point corresponding to said designating point.

26. The device according to claim 25, wherein said optimum searching pixel is configured to be positioned at least one of above, below, to the right of, and to the left of said designating point in said first image.

27. The device according to claim 26, wherein said optimum searching pixel comprises four pixels, each of which is respectively positioned above, below, to the right of, and to the left of said designating point in said first image.

28. The device according to claim 25, wherein said selector is configured to select said optimum searching pixel such that the square of a difference between a pixel value of said designating point and a pixel value of said optimum searching pixel reaches a maximum.

29. The device according to claim 25, wherein said selector is configured to select said optimum searching pixel such that, for red, green, and blue components, the sum of the squares of differences between a pixel value of said designating point and a pixel value of said optimum searching pixel reaches a maximum.

30. The device according to claim 25, further comprising:
   an inputter configured to input pixel information regarding pixel values and coordinates of each pixel in said first and second images; and
   a photographing device configured to photograph position information regarding a photographing position and an attitude of a camera when photographing said first and second images.

31. The device according to claim 30, wherein said obtaining device comprises:
   a first obtainer configured to obtain a corresponding line, which is a straight line corresponding to said designating point in the object space, using the coordinate of said designated point in said first image, and said photographing position information of the camera when photographing said first image; and
   a second obtainer configured to obtain said candidate points, using the coordinates of a point on said corresponding line in the object space, and said photographing position information of said camera when photographing said second image.

32. The device according to claim 31, wherein said first obtainer is configured to obtain said corresponding line based on the coordinates of said designating point, said photographing position information of said camera when photographing said first image, a focal length of said camera, and a pixel pitch of said first image.

33. The device according to claim 31, wherein said second obtainer is configured to obtain said candidate points based on the coordinates of a point on said corresponding line in the object space, said photographing position information of said camera when photographing said second image, a focal length of said camera, and a pixel pitch of said second image.

34. The device according to claim 31, wherein the corresponding line comprises a straight line passing through said designating point and a predetermined point in said camera.

35. The device according to claim 25, wherein said calculator is configured to calculate the sum of the squares of the differences between the pixel values of said designating point and said optimum searching pixels and the corresponding pixel values of said candidate point and said candidate point surrounding pixels as the error.

36. The device according to clam 35, wherein said calculator is configured to calculate the sum of red, green, and blue components.

37. A matching device for processing first and second images in which a common object is photographed, to detect a corresponding point, which is contained in said second image and corresponds to a designating point contained in said first image, said device comprising:

a designator configured to designate an arbitrary pixel, contained in said first image, as said designating point;

a selector configured to select a plurality of optimum searching pixels from said first image in such a manner that the deviation of pixel values of said plurality of optimum searching pixels and said designating point becomes maximum, said optimum searching pixels existing proximate said designating point;

an obtaining device configured to obtain candidate points and candidate point surrounding pixels that correspond to said designating point and said optimum searching pixel, respectively, said candidate points and said candidate point surrounding pixels being contained in said second image;

a calculator configured to calculate an error based on pixel values of said designating point, said optimum searching pixel, said candidate points, and said candidate point surrounding pixels; and an extractor configured to extract one of said candidate points, by which said error becomes the minimum, as said corresponding point corresponding to said designating point.

38. The device according to claim 37, wherein said optimum searching pixels are contained in a plurality of areas, which are positioned around said designating point in said first image.

39. The device according to claim 38, wherein said optimum searching pixels comprise four pixels respectively positioned at the upper-right, upper-left, lower-right, and lower-left sides relative to said designating point in said first image.

40. The device according to claim 37, wherein said selector is configured to select said plurality of optimum searching pixels in such a manner that the sum of the squares of the differences between the pixel value of said designating point and the pixel values of said optimum searching pixels reaches a maximum.

41. The device according to claim 40, wherein said selector is configured to calculate the sum of red, green, and blue components.

42. The device according to claim 37, further comprising:

an inputter configured to input pixel information regarding pixel values and coordinates of each pixel in said first and second images; and a photographing device configured to photograph position information regarding a photographing position and an attitude of a camera when photographing said first and second images.

43. The device according to claim 42, wherein said obtaining device comprises:

a first obtainer configured to obtain a corresponding line, which is a straight line corresponding to said designating point in the object space, using the coordinates of said designating point in said first image, and said photographing position information of said camera when photographing said first image; and a second obtainer configured to obtain said candidate points, using the coordinates of a point on said corresponding line in the object space, and said photographing position information of said camera when photographing said second image.

44. The device according to claim 43, wherein said first obtainer is configured to obtain said corresponding line based on the coordinates of said designating point, said photographing position information of said camera when photographing said first image, a focal length of said camera, and a pixel pitch of said first image.

45. The device according to claim 43, wherein said second obtainer is configured to obtain said candidate points based on the coordinates of a point on said corresponding line in the object space, said photographing position information of said camera when photographing said second image, a focal length of said camera, and a pixel pitch of said second image.

46. The device according to claim 43, wherein said corresponding line comprises a straight line passing through said designating point and a predetermined point in the camera.

47. The device according to claim 37, wherein said calculator is configured to calculate the sum of the squares of the differences between the pixel values of said designating point and said optimum searching pixels and the corresponding pixel values of said candidate point and said candidate point surrounding pixels, as the error.

48. The device according to claim 47, wherein said calculator is configured to calculate the sum of red, green, and blue components.

* * * * *